US006154148A

United States Patent [19]

[11] Patent Number: 6,154,148
[45] Date of Patent: Nov. 28, 2000

Fluharty et al.

[54] VEHICLE-TO-INDIVIDUAL PAGING SYSTEM

[75] Inventors: William J. Fluharty; Mark L. Zeinstra, both of Holland, Mich.

[73] Assignee: Prince Corporation, Holland, Mich.

[21] Appl. No.: 08/996,434

[22] Filed: Dec. 22, 1997

[51] Int. Cl.[7] .......... H04Q 7/14
[52] U.S. Cl. .......... 340/825.44; 340/825.22
[58] Field of Search .......... 340/825.44, 825.22, 340/311.1, 539, 425.5; 455/89, 404, 151.2; 341/173, 176

[56] References Cited

U.S. PATENT DOCUMENTS

| | | | |
|---|---|---|---|
| 3,808,538 | 4/1974 | Goransson et al. | 340/825.44 |
| 4,661,972 | 4/1987 | Kai | 455/404 |
| 4,726,070 | 2/1988 | Buzzi | 455/89 |
| 4,905,270 | 2/1990 | Ono | 455/404 |
| 4,906,972 | 3/1990 | Spencer | 340/539 |
| 4,906,989 | 3/1990 | Kasugai | 340/825.44 |
| 5,379,453 | 1/1995 | Tigwell | 455/151.2 |
| 5,479,155 | 12/1995 | Zeinstra et al. | 340/825.22 |
| 5,510,791 | 4/1996 | Viertel et al. | 341/173 |

*Primary Examiner*—Edwin C. Holloway, III
*Attorney, Agent, or Firm*—Harness, Dickey & Pierce, P.L.C.

[57] ABSTRACT

A docking station is incorporated within a vehicle accessory, such as a visor, and includes sockets for receiving paging receivers which include rechargeable batteries for charging the clip-on paging receivers to the visor when not in use. The visor includes a paging transmitter with a control switch associated with each of the plurality of paging receivers for transmitting an individual code associated with each of the receivers. Receivers comprise clip-on modules which attach to the visor for storage and recharging of their rechargeable battery. The paging receiver includes an alarm, such as a beeper, so that when a paging signal is received, the beeper sounds notifying the individual that the transportation is awaiting. The docking station visor may also include a trainable garage door opening transmitter and the paging transmitter can be integrated with the trainable garage door opening transmitter to provide multiple functions.

28 Claims, 3 Drawing Sheets

VEHICLE-TO-INDIVIDUAL PAGING SYSTEM

BACKGROUND OF THE INVENTION

The present invention relates to a vehicle-to-individual paging system and particularly a system by which multiple paging units are removably mounted to a vehicle docking station, such as a visor which includes a paging transmitter.

With today's lifestyle involving children's activities, mothers and fathers frequently believe they are taxi drivers ferrying their children to school, various after school activities, shopping malls and other activities remote from the home environment. Children, as it were, are sometimes inattentive to times at which they are to be picked up and the parents or guardians have been known to become impatient when waiting in a vehicle for their charges to return for subsequent transportation. Lines of cars are frequently seen in front of schools, gymnasiums, shopping malls and the like with the parents eagerly awaiting the appearance of one or more of their children. Not infrequently, the car will be left while the parent forges through the building looking for their offspring.

In order to more efficiently improve the process of picking up children (or others) at various activities, it would be desirable to alert the child that the parent is awaiting their return to the vehicle. Although existing paging systems can be employed for such a purpose, they are relatively expensive, requiring the transmission of signals to a subscription service and the paging units themselves are somewhat expensive. To use the system would typically require use of a cellular telephone in the vehicle and a paging transponder on the person. It would be desirable, therefore, to have a system in which an individual could be notified electronically when the person picking the individual up is available and ready for the transportation without the need for two subscription services and two different and expensive electronic units.

SUMMARY OF THE PRESENT INVENTION

The system of the present invention provides a solution to this problem by utilizing a paging transmitter located in the vehicle and operating on the presently available 900 MHz frequency range for transmitting encoded signals identifying a unique paging receiver which can be provided to one or more individuals with which the paging transmitter operates. In a preferred embodiment of the invention, a docking station is incorporated within a visor and includes sockets for receiving three paging receivers which include rechargeable batteries for charging the clip-on paging receivers to the visor when not in use. The visor includes an integral paging transmitter with a control switch associated with each of the plurality of paging receivers for transmitting an individual code associated with each of the receivers. Receivers comprise clip-on modules which attach not only to the visor for storage and recharging of the rechargeable battery but also can be carried or clipped onto the individual's clothing. The paging receiver includes a suitable alarm, such as a beeper, so that when a paging signal is received, the beeper sounds notifying the individual that the transportation is awaiting. In one preferred embodiment of the invention, the docking station visor further includes a trainable garage door opening transmitter and the paging transmitter is integrated with the trainable garage door opening transmitter to provide multiple functions for the electrical circuit employed.

Thus, with the system of the present invention, a vehicle paging system is provided which conveniently positions the stored paging receivers in a docking station for ready use and allows the user to efficiently notify an individual that transportation is awaiting. These and other features, objects and advantages of the present invention will become apparent upon reading the following description thereof together with reference to the accompanying drawings.

DETAILED DESCRIPTION OF THE PREFERRED EMBODIMENT

Figure 1:
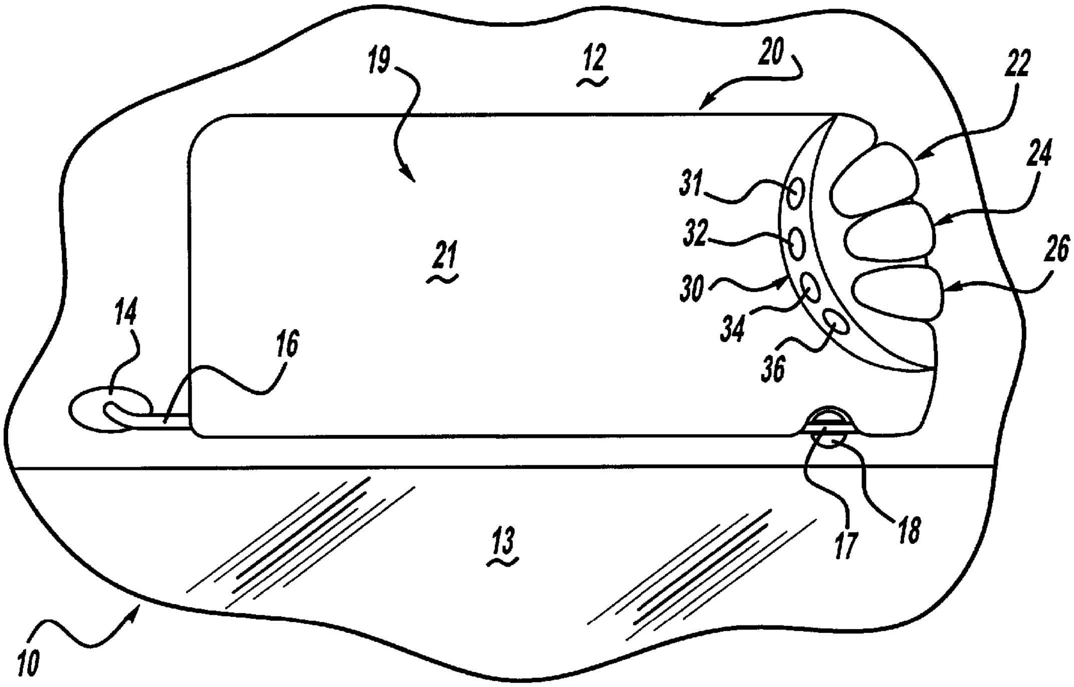
FIG. 1 is a fragmentary perspective view of a vehicle embodying a paging system of the present invention mounted in a visor shown in a raised stored position against the vehicle headliner.
Figure 2:
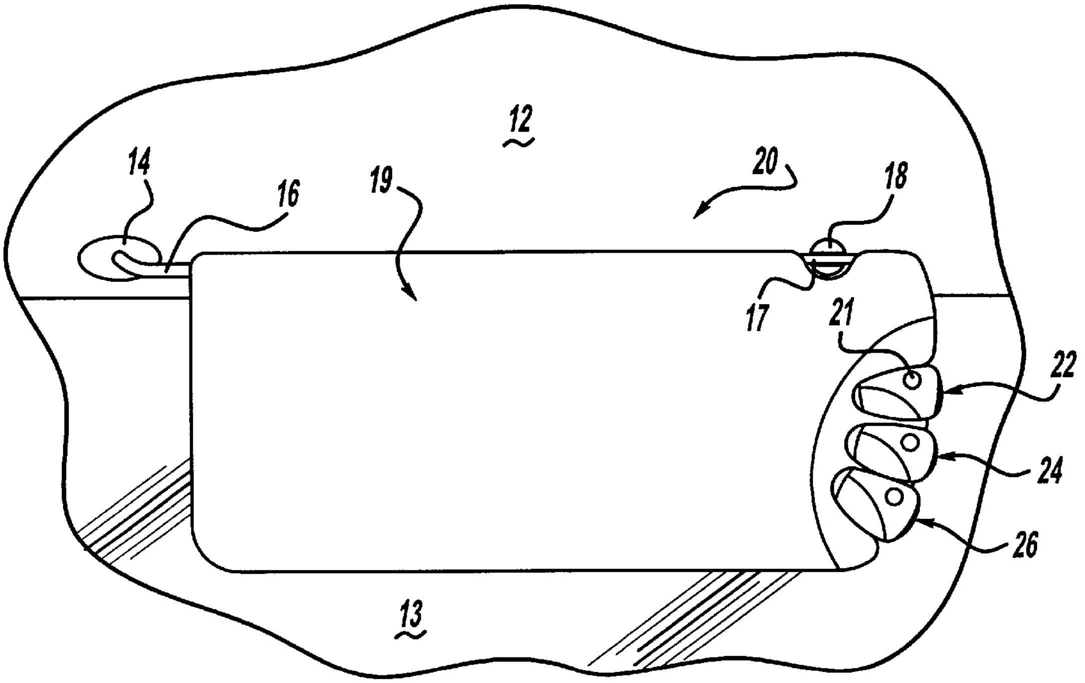
FIG. 2 is a fragmentary perspective view of the structure shown in FIG. 1 shown with the visor in a lowered position.
Figure 3:
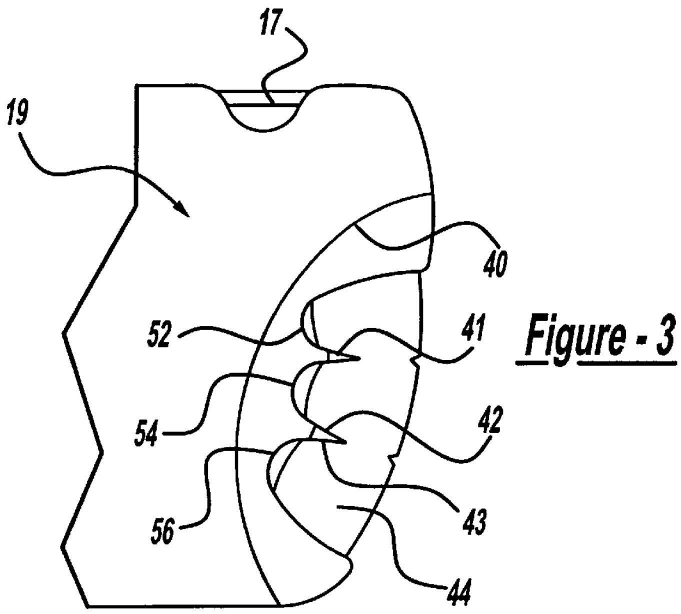
FIG. 3 is a fragmentary perspective view of the end of the visor shown in FIG. 2, shown with the paging receivers removed therefrom.

Referring initially to FIG. 1, there is shown a vehicle 10, such as an automobile, which includes on the driver's side, a visor assembly 20 serving as a visor as well as a docking station for a plurality of paging receivers 22, 24 and 26, which are mounted to an outer peripheral edge of the visor, as seen in FIGS. 1–3. The visor assembly 20 includes a visor body 19 having a core which can be conventionally made of a polymeric material, such as polypropylene, or fiberboard and which is covered by a suitable upholstery material 21 to conform the visor to the interior of the vehicle, which includes a headliner 12 covering the sheet metal roof structure to which the visor assembly 20 is mounted by means of a pivot rod assembly 14, which can be of conventional construction. Pivot rod assembly 14 includes a hollow pivot rod 16 through which at least a positive electrical supply conductor extends for providing operating power to the visor electrical circuit, as described in greater detail below. The visor 20 also includes an auxiliary mounting rod 17 which is removably mounted to a roof-mounted socket 18 such that the visor can be moved from a lowered use position as shown in FIG. 2 to a side window position if desired. When lowered as shown in FIG. 2, visor 20 serves to provide a sun blocking function for the windshield 13 of the vehicle as well as exposing the controls for the paging receiver as described below.

The visor 20 integrally also includes a HomeLink® trainable transmitter circuit 30 mounted within the visor body and which includes an indicator LED 31 which is actuated whenever one of the control switches 32, 34 or 36 are actuated to operate any one of three remotely controlled devices, such as a garage door, a security gate, home lighting or other devices to be controlled by the trainable transmitter. The trainable transmitter can be of the type described in U.S. Pat. No. 5,661,804 entitled TRAINABLE TRANSMITTER CAPABLE OF LEARNING VARIABLE CODES, which issued Aug. 26, 1997, the disclosure of which is incorporated herein by reference.

Figure 5:
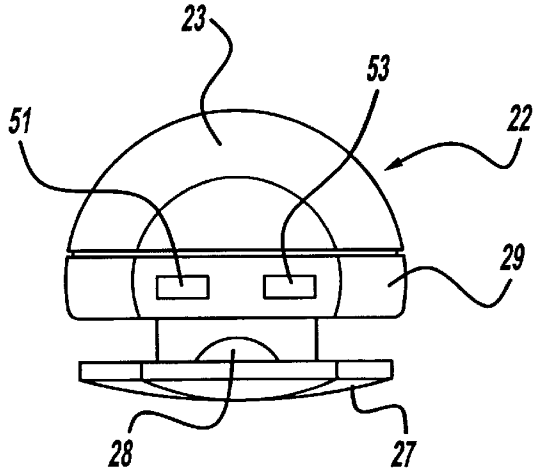
FIG. 5 is a left end elevational view of the paging receiver shown in FIG. 4.
Figure 6:
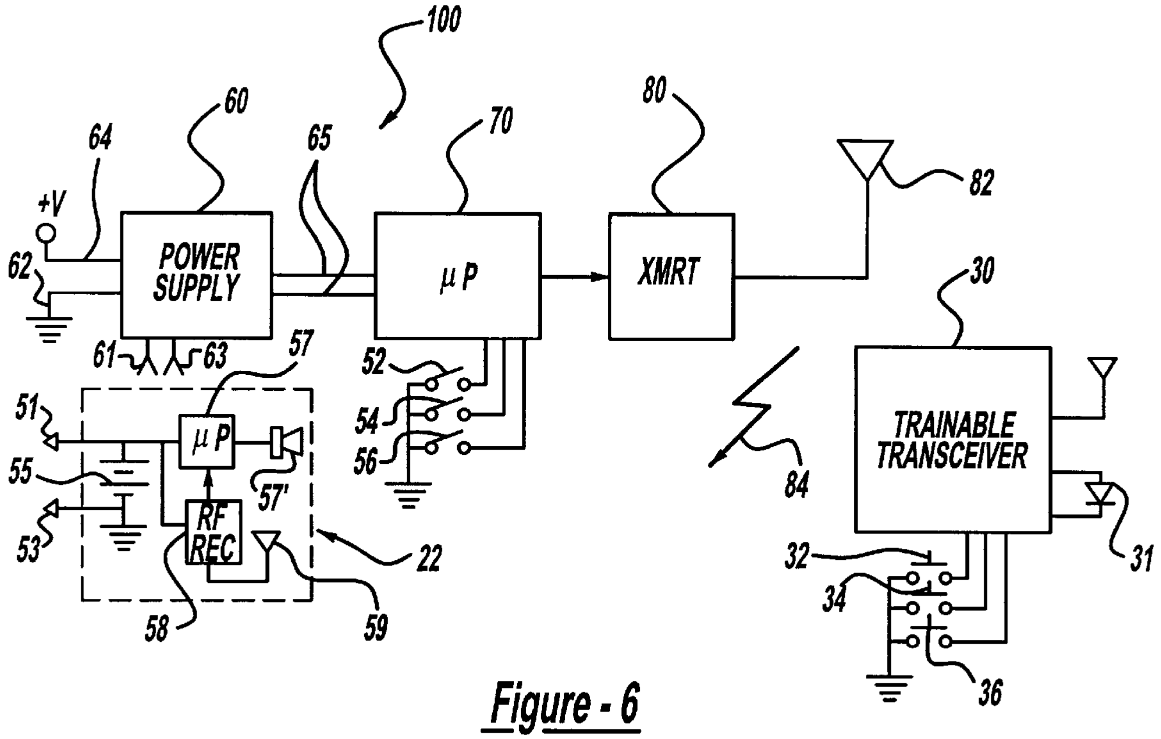
FIG. 6 is an electrical circuit diagram in block and schematic form of the paging system of the present invention showing one of the paging receivers associated therewith.

The visor 20 defines, as noted above, a docking station for receiving three paging receivers 22, 24 and 26, each of which are substantially identical except for the programming of an individual code associated with each of the receivers. For purposes of describing the system, only one receiver will be described in detail, it being understood that they are substantially identical with the exception of the individual code associated with the receiver and perhaps an indicia, such as a color, number, or the like which also identifies the paging receiver so that it can be associated with an individual. For purposes of serving as a docking station, the visor body 19, as best seen in FIG. 3, includes a recessed, sculpted, semicircular corner area 40 and three contiguous semicircular sockets 41, 42 and 43 extending inwardly from the blade-like core section 44 within the recessed area 40 of the corner of the visor. Thus, the blade 44 serves as a reduced thickness mechanical surface to which the clip-on paging receivers 22, 24 and 26 can be mounted, while the recessed sockets 41, 42 and 43 each include an end wall with electrical contacts 61 and 63, as seen in FIG. 6, for mating with corresponding contacts 51 and 53 of the paging receiver, as shown in FIG. 5. Mounted within the body 19 of the visor 20 is the electrical circuit shown in FIG. 6, which includes individual page/transmit switches 52, 54 and 56 associated with paging receivers 22, 24 and 26, respectively. Switches 52, 54 and 56 are momentary push-button switches which, as described below, cause the paging transmitter to transmit an RF signal coded to an associated one of the paging receivers. The paging receivers 22, 24 and 26 nestably dock within the visor 20 as seen in FIGS. 1 and 2 such that they become an integral part of the visor when held to the docking station for storage and for recharging of the rechargeable batteries contained within each of the paging receivers.

Figure 4:
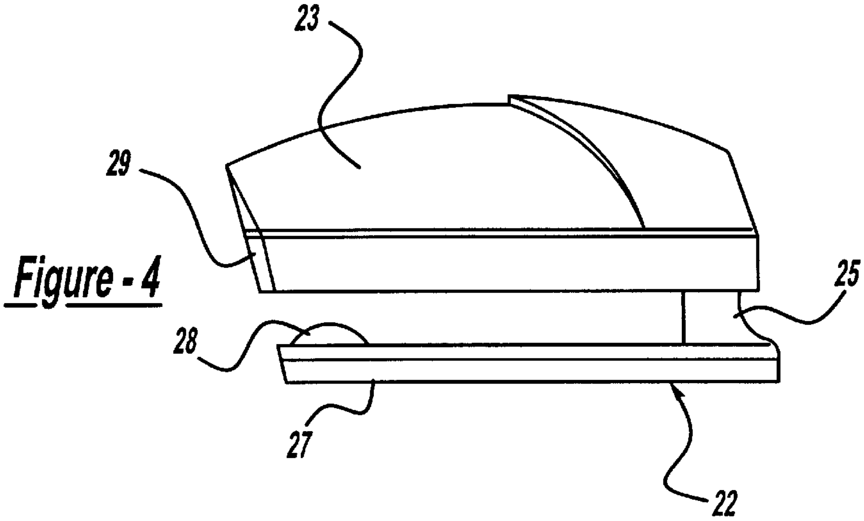
FIG. 4 is an enlarged front end elevational view of one of the paging receivers shown in FIG. 1 and 2.

Each paging receiver, as noted above, is substantially identical except for the identification code or indicia, and one such receiver is shown in detail in FIGS. 4 and 5. Paging receiver 22, shown in FIGS. 4 and 5, comprises an integral housing 23 with a curvilinear top surface and a pedestal 25 coupling the housing 23 to a clip 27. Housing 23, pedestal 25 and clip 27 are integrally made of a resilient polymeric material, such as polycarbonate or the like, such that the clip, which includes a rounded projection 28, will compressibly engage the blade section 44 of the visor 20 for storage of each of the receivers on the visor and to the paging receiver to an individual's clothing if carried in that manner. Each receiver housing 23 may include an identifying indicia 21 (FIG. 2), such as a color dot uniquely identifying each of the three paging receivers. Such indicia may also include a number or the like. Each of the paging receivers include at end 29 of housing 23 a pair of contacts 51, 53 which mateably engage corresponding contacts 61, 63 in the docking station sockets (41 for paging receiver 22) as described also in greater detail below in connection with FIG. 6.

Turning now to FIG. 6, there is shown the electrical circuit 100 mounted within the visor and one of the three paging receivers 22. Each of the receiver circuits are identical except for the preprogrammed code so only one of the three paging receivers are shown. The visor includes a ground conductor 62 which may be made through the metal pivot rod 16 itself or through a separate conductor coupled to the power supply 60, which also includes a positive supply conductor 64. The power supply 60 includes three pairs of output contacts 61 and 63 with one such pair being located on each of the paging receiver docking sockets 41, 42 and 43 of the visor and which mate with corresponding contacts 51 and 53 of each of the paging receivers 22, 24 and 26. Thus, when the paging receivers are mounted to the visor as shown in FIGS. 1 and 2, the contacts 51 and 53 mate with correspondingly polarized contacts 61 and 63 to receive operating power for recharging a rechargeable battery 55 of each of the paging receivers. Battery 55 can be a nickel cadmium or other rechargeable battery having a voltage to provide power for both a microprocessor 57 and an RF receiver 58 coupled to the battery 55 as shown in FIG. 6. The power supply 60 may include a conventional voltage control to prevent over charging of the individual batteries 55. Typically, the conductor 64 supply of power supply 60 will be coupled to an ignition-on supply line. RF receiver 58 can be of conventional design, such as employed in 900 MHz remote telephone receivers, and is tuned to a pretuned frequency within the 900 MHz band to receive signals by antenna 59 transmitted by the paging transmitter 80. The transmitted paging signal uniquely includes a digital code identifying the individual paging receiver, which signal is demodulated by the microprocessor 57, which includes an audio drive circuit for activating a Piezo electric transducer 57' alerting the individual carrying the paging receiver that a paging signal has been received. The code can be any selected four to seven bit binary code with the receiver code preprogrammed in microprocessor 57 corresponding to the same code as the transmitter channel associated with the same receiver.

The paging transmitter 80 is also controlled by a microprocessor 70 coupled to power supply 60 by suitable supply conductors 65. The three paging control switches 52, 54 and 56 are inputted to the microprocessor which responds to each of the switches to generate the digital code sent to the transmitter which provides an RF binary transmit "on" and "off" control to transmitting antenna 82 for transmitting a CW modulated carrier frequency RF signal 84 to be received by the paging receiving antenna 59. The RF signal 84 can employ other suitable modulation schemes as desired. By utilization of the 900 MHz frequency band, sufficient power is transmitted by the antenna 82 to provide up to a quarter mile range for the reception of paging signals to be received by the selected one of the paging receivers 22, 24 or 26. The programming of the microprocessor 70 to provide the enable/disable signals to the transmitter 80 is conventional and includes a loop continuously monitoring switches 52, 54 and 56 for activation and a stored code associated with each switch. Upon detecting activation of a switch, the microprocessor outputs the associated stored paging code for the selected one of the paging receivers associated with the circuit 100 shown in FIG. 6.

Figure 7:
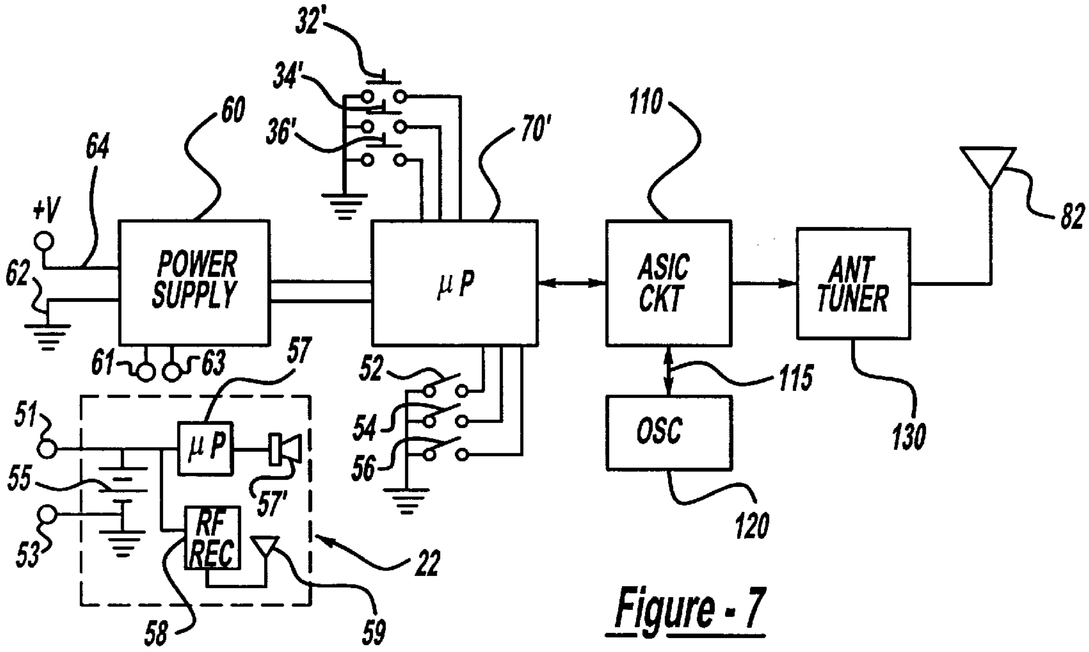
FIG. 7 is a electrical circuit diagram in block and schematic form of an alternative embodiment of the present invention.

As noted above in the embodiment of the invention shown in FIGS. 1–6, the HomeLink® trainable transmitter is a separate circuit. In some embodiments, it may be desirable to incorporate the paging transmitter with the trainable transmitter and, for such purpose, the alternative embodiment shown in FIG. 7 can be employed. In FIG. 7, the identical reference numerals are employed for substantially identical circuits. The paging receivers, of course, are identical to that described above in connection with the embodiment shown in FIGS. 1–6 as is the power supply 60. In the embodiment shown in FIG. 7, a microprocessor 70' is employed and detects not only the actuation of paging transmit switches 52, 54, 56 but also the trainable transmitter switches 32', 34', 36' associated with the remote control devices to be controlled by the transmission of information on the typical garage door opening frequency band of 200 to 450 MHz as opposed to the 900 MHz band employed for the paging transmitter. The microprocessor 70', thus, provides a signal to an application specific integrated circuit 110 which is a logic circuit coupled to a multiple frequency oscillator 120 providing a control signal in response to the detection of the actuation of one of the paging control switches or remote device control switches to control the oscillator to provide the desired output frequency associated with either a paging receiver 22, 24, 26 or a device to be remotely controlled, such as a garage door opening receiver, a home light control receiver, or the like. Depending upon the control signal received by the oscillator 120, therefore, it will provide a frequency selected by the actuation of one of the six switches coupled to microprocessor 70' and output on conductors 115 to circuit 110 a frequency which is modulated by the code generated by microprocessor 70' and applies the selected modulated frequency signal to an antenna tuner circuit 130 which couples circuit 110 to antenna 82 for maximum radiation efficiency. Thus, circuit 130 tunes the antenna to the output of circuit 110 to the appropriate frequency band required for the transmission of either a paging signal or a remote control signal. The construction of the antenna tuner, oscillator 120 and logic circuit 110 can be of the type described in U.S. Pat. No. 5,669,054 entitled TRAINABLE TRANSCEIVER INCLUDING A DYNAMICALLY TUNABLE ANTENNA, which issued on Dec. 16, 1997, the disclosure of which is incorporated herein by reference. Oscillator circuit 120 also can be a conventional voltage control oscillator utilizing either one or two separate oscillators for the desired frequency coverage if necessary. Signals supplied to the oscillator by bus 115 from circuit 110 will control the selection of the frequency depending on the actuation of one of the switches coupled to microprocessor 70'. Thus, with the system of FIG. 7, a single electrical circuit is mounted in the visor and provides both the trainable transmitter functions as provided by the separate system 30 in FIGS. 1–6 as well as integrating the paging transmitter function.

The docking station provided by the visor is a convenient location for use of the system and particularly conveniently located for the driver of a vehicle who can remove one of the paging receivers and hand it to an exiting individual. Other docking stations, however, can be employed as long as they are conveniently located within an accessory of the vehicle, which may include a rearview mirror, an overhead console, a floor console or the like which also provides the recharging and storage functions for the paging receivers. These and other modifications to the preferred embodiment will become apparent to those skilled in the art and will fall within the spirit or scope of the invention as defined by the appended claims.

The invention claimed is:

1. A vehicle-to-individual paging system comprising:
   - a vehicle accessory for mounting in a vehicle, said accessory including a docking station for receiving at least one paging receiver;
   - a paging transmitter associated with said docking station including an operator-actuated switch for originating operator paging transmissions from the vehicle;
   - said docking station including a power supply and electrical contacts for charging a paging receiver; and
   - a paging receiver including a housing for removably mounting said paging receiver to said docking station and electrical contacts such that said contacts on said paging receiver engage said contacts on said docking station for charging said paging receiver when mounted to said docking station.

2. The paging system as defined in claim 1 wherein said paging transmitter is mounted to said docking station and said docking station includes a switch for selectively actuating said paging transmitter for transmitting a paging signal to said paging receiver.

3. The paging system as defined in claim 2 wherein said docking station includes a plurality of switches and a microprocessor coupled to the switches for encoding a signal uniquely identifying each one of a plurality of paging receivers and a plurality of paging receivers.

4. The paging system as defined in claim 3 wherein said vehicle accessory is a visor.

5. The paging system as defined in claim 4 wherein said docking station includes a plurality of spaced sockets, each socket including electrical contacts for receiving a paging receiver.

6. The paging system as defined in claim 5 wherein said visor further includes a trainable transmitter for controlling a remotely controlled device.

7. The paging system as defined in claim 1 wherein said paging receiver includes a rechargeable battery.

8. A vehicle-to-individual paging system comprising:
   - a docking station positioned in a vehicle accessory for removably receiving a plurality of paging receivers;
   - a paging transmitter mounted in said docking station for originating paging messages from the docking station; and
   - a plurality of paging receivers including a housing for removably mounting said paging receivers to said docking station such that an individual in the vehicle can selectively transmit a paging signal to each of said paging receivers carried by other individuals at locations remote from the vehicle.

9. The paging system as defined in claim 8 wherein said docking station includes a plurality of switches and a microprocessor coupled to the switches for encoding a transmitted signal uniquely identifying each one of said plurality of paging receivers.

10. The paging system as defined in claim 9 wherein each paging receiver includes a rechargeable battery.

11. The paging system as defined in claim 10 wherein said docking station includes a plurality of individual sockets, each including contacts for receiving a paging receiver such that said rechargeable battery of a paging receiver is recharged when in said docking station.

12. The paging system as defined in claim 11 wherein said docking station further includes a trainable transmitter for controlling a remotely controlled device.

13. The paging system as defined in claim 12 wherein said transmitter is an RF transmitter.

14. The paging system as defined in claim 13 wherein said transmitter operates in the 900 MHz band.

15. The paging system as defined in claim 14 wherein said vehicle accessory comprises a visor.

16. A vehicle-to-individual paging system comprising:
   - a visor including an edge with a plurality of sockets for removably receiving a plurality of paging receivers;
   - an RF paging transmitter mounted in said visor, said transmitter including an operator-actuated switch for originating paging messages from the vehicle; and
   - a plurality of RF paging receivers, each including a housing for removably mounting said paging receivers to said visor, such that an individual located within the vehicle can send a paging signal to one or more of the paging receivers.

17. The paging system as defined in claim 16 wherein said paging transmitter includes switches for selectively actuating said paging transmitter for transmitting a paging signal uniquely identifying each of said paging receivers.

18. The paging system as defined in claim 17 wherein said visor includes a plurality of sockets, each including electrical contacts for receiving a paging receiver,and each of said paging receivers includes a rechargeable battery for charging said battery when said receiver is mounted to said visor.

19. The paging system as defined in claim 18 wherein said visor further includes a trainable transmitter for controlling a remotely controlled device.

20. A vehicle-to-individual communication system comprising:

a vehicle accessory including a docking station for receiving at least one RF receiver;

a transmitter associated with said docking station, said transmitter including a trainable transceiver and operable on multiple frequency RF bands;

a controller and a plurality of switches coupled to said controller to control said transmitter for selectively transmitting one of a communications and a remote control signal; and an RF receiver including a housing for removably mounting said receiver to said docking station to allow said receiver to be carried by an individual, such that a person in the vehicle can communicate with an individual carrying a receiver at a location remote from the vehicle.

21. The system as defined in claim 20 wherein said vehicle accessory is a visor.

22. The system as defined in claim 20 wherein said docking station includes a power supply and electrical contacts for charging a receiver and said receiver includes a rechargeable battery.

23. The system as defined in claim 22 wherein said docking station includes a plurality of sockets for receiving a plurality of RF receivers.

24. A vehicle-to-individual communication system comprising:

a visor including a docking station for removably receiving a plurality of RF receivers wherein said docking station includes a plurality of sockets, each including contacts coupled to a power supply, said contact aligned for receiving a receiver such that a rechargeable battery of a receiver is recharged when in said docking station;

an RF transmitter mounted in said visor;

switches coupled to said transmitter for originating a communication to a receiver by transmitting an RF signal uniquely identifying each of a plurality of receivers; and a plurality of RF receivers including a rechargeable battery and housing for removably mounting said receivers to said sockets of said docking station.

25. The paging system as defined in claim 24 wherein said transmitter is a trainable transmitter for controlling a remotely controlled device.

26. The system as defined in claim 24 wherein each RF receiver includes a clip for attaching to receiver to an individuals clothing.

27. The system as defined in claim 26 wherein each RF receiver includes a visible indicia uniquely identifying the receiver.

28. The system as defined in claim 27 wherein said indicia is a color marking.

* * * * *